United States Patent Office 3,849,461
Patented Nov. 19, 1974

3,849,461
PREPARATION OF LIQUID POLYNUCLEAR
FERROCENE DERIVATIVES
Harry J. Hyer, Palo Alto, and Thomas P. Rudy, Saratoga, Calif., assignors to United Aircraft Corporation, East Hartford, Conn.
No Drawing. Continuation-in-part of abandoned application Ser. No. 663,517, Aug. 28, 1967. This application Mar. 29, 1968, Ser. No. 718,312
Int. Cl. C07f 15/02
U.S. Cl. 260—439 CY    22 Claims

ABSTRACT OF THE DISCLOSURE

In a method for producing noncrystalline liquid polynuclear ferrocene derivatives which comprises condensing a hydrocarbyl substituted ferrocene, said hydrocarbyl substituents having $m$ carbon atoms; with a material selected from the group consisting of aliphatic and alicyclic aldehydes having $n$ carbon atoms, wherein $m$ is an integer from 1–6, $n$ is an integer from 1–12 and the value of the relationship $2m+n$ is from 3–14; in an inert diluent and in the presence of an acid catalyst; the improvement whereby a low viscosity product consisting primarily of dimeric derivatives is obtained which comprises adding the acid catalyst to the solution of the alkyl ferrocene in the inert solvent to dissipate the heat of solvation of the acid prior to admixture with a solution of the aldehyde or its precursor. The addition of a lower aliphatic alcohol, particularly ethanol, to the reaction mixture also tends to increase the yield of the low viscosity product.

BACKGROUND OF THE INVENTION

This application is a continuation-in-part of our co-pending, co-assigned patent application, Ser. No. 663,517, filed Aug. 28, 1967, now abandoned, for Combustion Catalysts, which discloses and claims ferrocene derivatives having the general structural formula:

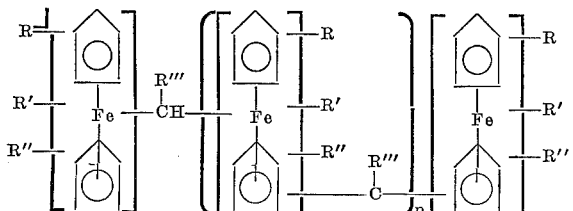

wherein R is a lower hydrocarbyl group, R' and R" are hydrogen or lower hydrocarbyl groups, the total number of carbon atoms in R, R' and R" being from 1–6; R''' is hydrogen or an aliphatic or alicyclic group having from 1–11 carbon atoms and $p$ is an integer from 0–4; the use of such material as combustion catalysts and the synthesis of such materials by the acid catalyzed condensation of an alkylferrocene and an aliphatic or alicyclic aldehyde. This disclosure is incorporated herein by reference.

The materials are used as combustion catalysts in solid propellants and, although the catalytic activity of all the materials is quite satisfactory, the low viscosity products consisting essentially of the dimeric form wherein $p$ in the above structural formula is equal to 0 are preferred because of the ease of processing and incorporation of the material into the solid propellant mix. The crude product obtained according to the process of the aforementioned patent application had a viscosity of approximately 400 cps. at 100° F., and distillation or fractionation of the crude product was required to obtain a fraction consisting essentially of the dimer and having a lower viscosity in those applications in which lower viscosities were required to meet processing limitations.

According to this invention, a process has been developed whereby the crude product has a viscosity of 325 cps. or lower at 100° F. which product comprises a substantial amount of the dimer and minor amounts of higher molecular weight products.

It is accordingly an object of this invention to provide a method of synthesis of liquid noncrystalline condensation products of hydrocarbyl substituted ferrocenes and aliphatic or alicyclic aldehydes which produces a substantial yield of the dimeric species.

It is another object of this invention to provide a method of synthesis of novel low viscosity liquid, noncrystalline condensation products of hydrocarbyl substituted ferrocenes and aliphatic or alicyclic aldehydes which have a low viscosity.

These and other objects of this invention will be readily apparent from the following description of the invention.

DESCRIPTION OF THE INVENTION

Noncrystalline condensation products of a hydrocarbyl substituted ferrocene, wherin the hydrocarbyl substituents have $m$ carbon atoms, and an aliphatic or alicyclic aldehyde having $n$ carbon atoms, wherein $m$ is an integer from 1–6, $n$ is an integer from 1–12 and the value of the relationship $2m+n$ is from 3–14, are noncrystaline, nonvolatile liquids which exhibit excellent activity as combustion catalysts in solid propellant compositions. The products are produced as described in the aforementioned patent application by the acid catalyzed condensation, in an inert diluent, of the appropriate substituted ferrocene and aldehyde or aldehyde precursor. The products produced thereby contained sufficient amounts of trimeric and higher polymers, in addition to the desirable dimeric species, to produce a viscosity of about 400 cps. This required a fractionation step to remove the trimeric and higher polymers and reduce the viscosity in those cases where a lower viscosity was required to facilitate the preparation of a solid propellant containing the material.

According to this invention a process is provided which produces a product containing a higher proportion of the preferred dimeric species thereby reducing the viscosity of the product.

These products are produced by condensing the hydrocarbyl substituted ferrocene with the aldehyde which may be supplied as either the aldehyde per se, or in the form of its precursor, the corresponding acetal. In order to obtain substantial yields of the preferred low viscosity dimeric species, the acid catalyzed reaction is conducted in an inert liquid with the heat of solvation of the acid catalyst being dissipated prior to the mixing of all the materials in the reaction vessel. This is preferably accomplished by adding the acid catalyst to the solution of one of the reactants, preferably the alkyl ferrocene, in the inert solvent and allowing the mixture to cool prior to the addition of the solution of the aldehyde or its precursor in the inert solvent. The reaction is preferably conducted at a low temperature but need not be maintained below 10° C. as was required in the process of the aforementioned patent application.

Suitable reactions producing good yields have been conducted at ambient temperatures of 20° C., and it is expected that good conversions can be obtained with temperatures as high as the reflux temperature of the mixture.

Suitable inert diluents are known to the art and include, while not being limited to, dioxane, ether, and alkanoic acids having from 1–6 carbon atoms. Anhydrous conditions are preferred since higher yields are obtained. It has been discovered that when ether is used as the diluent, the inclusion of a lower aliphatic alcohol such as methanol, ethanol, propanol, butyl alcohol and amyl alcohol for example and particularly ethanol, tends to somewhat reduce the overall conversion but shifts the product distribution substantially in favor of the preferred dimer, thereby reducing the viscosity of the product. The effect of the alcohol is independent of the effect produced by the sequence of addition of the catalyst described above and is cumulative therewith. Thus, where both features are combined, the product has a viscosity lower than is obtained only by the use of either one of these features. The amount of alcohol employed varies widely. For example, when about 0.1–0.2 moles of ethanol per mole of acid catalyst is utilized, no effect on the distribution of the product is noted but the alcohol functions as a processing aid by preventing emulsification in the washing step. When about 1 mole of ethanol per mole of acid is employed, the yield obtained at 10° C. or below is reduced from 55–60% to 15% but the 15% is almost exclusively dimer. The yield, however, can be increased by increasing the reaction temperature to ambient or higher, the upper temperature being limited by the reflux temperature of the reaction mixture. An increase in the proportion of dimer present in the product is noted when about .3 moles of ethanol per mole of alcohol is utilized.

EXAMPLE I

The condensation products produced according to the process of the aforementioned patent application were prepared as follows:

A solution of 242 gm. (1.0 mole) of n-butylferrocene, 38 gm. (0.5 mole) of methylal and 750 ml. anhydrous diethyl ether was prepared in a 2-liter, 3-necked, round-bottomed flask fitted with a stirrer, a reflux condenser and a 250 ml. dropping funnel. The flask and its contents were cooled in an ice-water bath to 10° C. Vigorous stirring was maintained while 222 ml. (4 moles) of concentrated sulfuric acid (sp. gr. 1.84, 18 molar) was added drop-wise over 20 minutes. Stirring was continued for 45 minutes after addition was completed, the mixture being maintained below 10° C. throughout this period. The reaction mixture was decanted into a 4-liter beaker containing approximately 1.5 kg. of cracked ice and neutralized by addition of 425 ml. saturated (50%) sodium hydroxide.

The mixture was transferred to a 2-liter separatory funnel and the aqueous phase separated and discarded. The ether phase was washed twice with 1-liter portions of water and then dried over anhydrous sodium sulfate. The dried ether solution was filtered through paper and the ether was removed by distillation from the reaction mixture. Unreacted n-butylferrocene (b.p. 75° C. at 0.5 torr) was distilled from crude reaction products under vacuum. Conversion of n-butylferrocene to crude product was 55%.

The product so produced had a viscosity of approximately 400 cps. at 100° F.

EXAMPLE II

A solution of 242 grams (1.0 mole) of n-butylferrocene in approximately 400 ml. of anhydrous diethyl ether was prepared in a 2-liter, 3-necked, round-bottom flask fitted with a stirrer, a reflux condenser and a 250 ml. dropping funnel. 222 ml. (4 moles) of concentrated sulfunric acid (sp. gr. 1.84, 18 molar) was added with cooling. After dissipation of the heat of solvation a solution of 38 gms. (0.5 moles) of methylal in 50 ml. of anhydrous diethyl ether was added drop-wise to the solution in the flask. Stirring was continued and the temperature of the reaction was maintained at about 10° C. for approximately 45 minutes. The reaction mixture was decanted into a 4-liter beaker containing approximately 1.5 kg. of cracked ice and neutralized by addition of 425 ml. of saturated (50%) sodium hydroxide.

The mixture was transferred to a 2-liter separatory funnel and the aqueous phase separated and discarded. The ether phase was washed twice with 1-liter portions of water and then dried over anhydrous sodium sulfate. The dried ether solution was filtered through paper and the ether was removed by distillation from the reaction mixture. Unreacted n-butylferrocene (b.p. 75° C. at 0.5 torr) was distilled from the crude reaction product under vacuum. Conversion of n-butylferrocene to crude product was 55% and the crude product exhibited a viscosity of 325 cps. at 100° F.

EXAMPLE III

The process of Example II was repeated with the following change: 92 gms. (2 moles) of ethanol was included in the ethereal solution of the methylal. The mixture was processed as in Example II and produced a conversion of n-butylferrocene to a crude product of about 35%. The viscosity of the crude product was 240 cps. at 100° F.

EXAMPLE IV 650 ml. diethyl ether, 23 gms. (0.5 mole) ethyl alcohol, 38 gms. (0.5 mole) methylal and 242 gms. (1 mole) n-butylferrocene were placed in a 2,000 ml., 3-necked, round-bottom flask fitted with a stirrer, a reflux condenser and a dropping funnel. The flask and its contents were cooled to approximately 10° C., and 111 ml. (4 moles) conc. sulfuric acid (sp. gr. 1.84) was added drop-wise over 45 minutes. Stirring was continued for 45 minutes following addition of the acid, the temperature being maintained at approximately 10° C. throughout.

The reaction mixture was decanted onto cracked ice and neutralized by addition of 535 ml. concentrated ammonium hydroxide (sp. gr. 0.9). The mixture was transferred to a separatory funnel and the aqueous phase separated and discarded. The ether phase was washed twice with 500 ml. portions of distilled water and then dried over anhydrous sodium sulfate. The solution was then filtered through paper and ether evaporated on a steam bath.

Unreacted n-butylferrocene was distilled from the crude product under vacuum. The yield of crude product was 116 gms. (48%) having a viscosity of 325 cps. at 100° F. with an iron content of 22.3%.

While this invention has been described with respect to specific examples thereof, the invention should not be construed as limited thereto. Various modifications may be made by workers skilled in the art without departing from the scope of this invention which is limited only by the following claims.

We claim:

1. In a method for producing noncrystalline noncrystallizable liquid polynuclear ferrocene derivatives which comprises condensing a hydrocarbyl substituted ferrocene, said hydrocarbyl substituents having $m$ carbon atoms, with a material selected from the group consisting of aliphatic aldehydes having $n$ carbon atoms and acetals derived therefrom, wherein $m$ is an integer from 1–6, $n$ is an integer from 1–12 and the value of the relationship $2m+n$ is from 3–14, in an inert diluent and in the presence of a catalytic amount of acid; the improvement which comprises adding the acid catalyst to the inert diluent prior to the formation of the completed reaction mixture, dissipating the heat of solvation thereof and subsequently completing the reaction mixture by addition of said material selected from the group consisting of aliphatic aldehydes having $n$ carbon atoms and acetals derived therefrom to the mixture of the other reactants and the catalyst.

2. In a method for producing noncrystalline noncrystallizable liquid polynuclear ferrocene derivatives which comprises condensing a hydrocarbyl substituted ferrocene, said hydrocarbyl substituents having $m$ carbon atoms; with a material selected from the group consisting of aliphatic aldehydes having $n$ carbon atoms and acetals derived therefrom, wherein $m$ is an integer from 1–6, $n$ is an integer from 1–12 and the value of the relationship $2m+n$ is from 3–14, in anhydrous diethyl ether in the presence of a catalytic amount of acid; the improvement which comprises conducting said reaction in the presence of a lower aliphatic alcohol.

3. The method of Claim 1, wherein said solvent is anhydrous diethyl ether and said reaction is conducted in the presence of a lower aliphatic alcohol.

4. The method of Claim 2, wherein said alcohol is ethanol.

5. The method of Claim 3, wherein said alcohol is ethanol.

6. The process of Claim 1, wherein the acid catalyst is sulfuric acid.

7. The process of Claim 2, wherein the acid catalyst is sulfuric acid.

8. The process of Claim 3, wherein the acid catalyst is sulfuric acid.

9. The process of Claim 4, wherein the acid catalyst is sulfuric acid.

10. The process of Claim 5, wherein the acid catalyst is sulfuric acid.

11. The process of Claim 1, wherein the inert diluent is diethyl ether.

12. The process of Claim 6, wherein the inert diluent is diethyl ether.

13. The process of Claim 1, wherein the substituted ferrocene is n-butylferrocene.

14. The process of Claim 2, wherein the substituted ferrocene is n-butylferrocene.

15. The process of Claim 3, wherein the substituted ferrocene is n-butylferrocene.

16. The process of Claim 6, wherein the substituted ferrocene is n-butylferrocene.

17. The process of Claim 7, wherein the substituted ferrocene is n-butylferrocene.

18. The process of Claim 1, wherein the aldehyde is formaldehyde.

19. The process of Claim 1, wherein the aldehyde is provided as the acetal.

20. The process of Claim 2, wherein the aldehyde is formaldehyde.

21. The process of Claim 2, wherein the aldehyde is provided as the acetal.

22. The process of Claim 3, wherein the aldehyde is provided as the acetal.

References Cited

UNITED STATES PATENTS 3,341,495　　9/1967　　Neuse _____ 260—67

OTHER REFERENCES

Levi: Ferrocene Polymers, U.S. Picatinny Arsenal, Dover, N.J., Plastics and Packaging Laboratory, 1966, pp. 5, 9, 13–17 and 19–21.

LELAND A. SEBASTIAN, Primary Examiner

U.S. Cl. X.R.

149—19, 109